United States Patent
Si et al.

(10) Patent No.: US 12,170,967 B2
(45) Date of Patent: Dec. 17, 2024

(54) SRS POWER CONTROL METHOD, CONFIGURATION METHOD FOR SRS POWER CONTROL, AND RELATED DEVICE

(71) Applicant: VIVO MOBILE COMMUNICATION CO., LTD., Guangdong (CN)

(72) Inventors: Ye Si, Guangdong (CN); Xiaodong Sun, Guangdong (CN); Peng Sun, Guangdong (CN); Huaming Wu, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 413 days.

(21) Appl. No.: 17/552,212

(22) Filed: Dec. 15, 2021

(65) Prior Publication Data

US 2022/0116888 A1  Apr. 14, 2022

Related U.S. Application Data

(63) Continuation of application No. PCT/CN2020/095364, filed on Jun. 10, 2020.

(30) Foreign Application Priority Data

Jun. 18, 2019  (CN) .......................... 201910526772.1

(51) Int. Cl.
*H04W 52/32* (2009.01)
*H04L 5/00* (2006.01)
(Continued)

(52) U.S. Cl.
CPC ......... *H04W 52/325* (2013.01); *H04L 5/0051* (2013.01); *H04W 52/242* (2013.01); *H04W 52/367* (2013.01); *H04W 56/001* (2013.01)

(58) Field of Classification Search
CPC ............ H04W 52/325; H04W 52/242; H04W 52/367; H04W 52/42; H04W 52/54; H04W 56/001; H04L 5/0051
See application file for complete search history.

(56) References Cited

U.S. PATENT DOCUMENTS

2014/0162718 A1  6/2014  Li
2015/0003263 A1  1/2015  Senarath et al.
(Continued)

FOREIGN PATENT DOCUMENTS

CN  104349444 A  2/2015
CN  106102150 A  11/2016
(Continued)

OTHER PUBLICATIONS

3rd Generation Partnership Project; Technical Specification Group Radio Access Network; NR; Physical layer procedures for control (Release 15), 3GPP TS 38.213, Mar. 2019, p. 2-104, V.15.5.0, 3GPP.
(Continued)

*Primary Examiner* — Farid Seyedvosoghi
(74) *Attorney, Agent, or Firm* — IP & T GROUP LLP

(57) ABSTRACT

An SRS power control method includes: receiving configuration information from a network device, where the configuration information is used to configure N power control parameter sets, a power control parameter set includes a path loss estimation reference signal (path loss RS), the path loss RS is associated with a neighboring cell and/or a serving cell, and N is a positive integer; and performing power control on at least one SRS unit according to the N power control parameter sets, where the at least one SRS unit is used for positioning, and an SRS unit is an SRS resource set or an SRS resource.

20 Claims, 4 Drawing Sheets

---

Receive configuration information from a network device, where the configuration information is used to configure N power control parameter sets — 201

Perform power control on at least one SRS unit according to the N power control parameter sets, where the at least one SRS unit is used for positioning — 202

(51) Int. Cl.
  *H04W 52/24* (2009.01)
  *H04W 52/36* (2009.01)
  *H04W 56/00* (2009.01)

(56) References Cited

U.S. PATENT DOCUMENTS

| | | | |
|---|---|---|---|
| 2015/0092699 | A1 | 4/2015 | Chen et al. |
| 2018/0167895 | A1 | 6/2018 | Lee et al. |
| 2019/0097777 | A1 | 3/2019 | Zhou et al. |
| 2019/0190747 | A1* | 6/2019 | Park .................... H04L 25/0226 |
| 2020/0404593 | A1 | 12/2020 | Yao et al. |
| 2022/0123886 | A1* | 4/2022 | Munier ................ G01S 5/0205 |

FOREIGN PATENT DOCUMENTS

| | | |
|---|---|---|
| CN | 107426742 A | 12/2017 |
| CN | 109803362 A | 5/2019 |
| CN | 109873663 A | 6/2019 |
| EP | 3481113 A1 | 5/2019 |
| WO | 2014/092497 A1 | 6/2014 |
| WO | 2018/202014 A1 | 11/2018 |

OTHER PUBLICATIONS

On Radio-Layer Procedures for NR Positioning, 3GPP TSG RAN WG1 Meeting #96bis, Apr. 8-12, 2019 R1-1904322, Intel Corporation, Xi'an, China.

Extended European Search Report for European Patent Application No. 20827940.6 issued by the European Patent Office on Jul. 6, 2022.

Remaining issues on UL-based positioning, 3GPP TSG RAN WG1 Meeting #96, R1-1901575, Feb. 25-Mar. 1, 2019, Athens, Greece. Source: Huawei, HiSilicon.

Views on NR uplink positioning techniques, 3GPP TSG RAN WG1 Meeting #96, R1-1901715, Feb. 25-Mar. 1, 2019, Athens, Greece. Source: vivo.

International Search Report and Written Opinion of International Application No. PCT/CN2020/095364 mailed on Aug. 26, 2020.

First Office Action of Priority Application No. 201910526772.1 mailed on Jan. 5, 2021.

* cited by examiner

Send configuration information to a terminal, where the configuration information is used to configure N power control parameter sets, and the N power control parameter sets are used to perform power control on at least one SRS unit — 301
FIG. 3
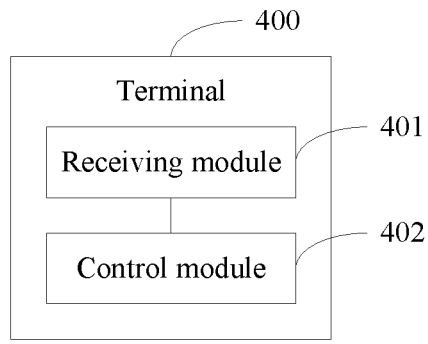
FIG. 4
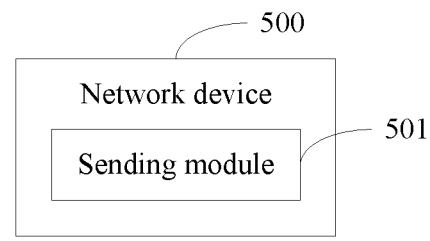
FIG. 5

SRS POWER CONTROL METHOD, CONFIGURATION METHOD FOR SRS POWER CONTROL, AND RELATED DEVICE

CROSS-REFERENCE OF RELATED APPLICATIONS

This application is a Bypass Continuation Application of PCT/CN2020/095364 filed on Jun. 10, 2020, which claims priority to Chinese Patent Application No. 201910526772.1 filed on Jun. 18, 2019, which are incorporated herein by reference in their entirety.

TECHNICAL FIELD

The present disclosure relates to the field of communications technologies, and in particular, to a sounding reference signal (SRS) power control method, a configuration method for SRS power control, and a related device.

BACKGROUND

In the 5th-generation (5G) mobile communication, according to different functions of an SRS, the SRS may be sent for beam management, codebook-based transmission, non-codebook-based transmission, and antenna switching. A user equipment (UE) may obtain a plurality of SRS resource sets through higher-layer signaling. A configuration of each SRS resource set includes a purpose, a periodical characteristic, and the like of the SRS resource set.

In the 5G mobile communication system, in one timeslot, an SRS resource may occupy the last 6 symbols, higher-layer signaling may be used to configure that the SRS resource occupies 1, 2 or 4 symbols for transmission, and it is supported that a comb structure in frequency domain is comb-2 and comb-4. According to different sending periods of an SRS resource, it is supported that the SRS resource is periodically sent, is semi-persistently sent, and is aperiodically triggered. For the aperiodic SRS resource, higher-layer signaling is used to configure an SRS resource set and a slot offset corresponding to a trigger state of each SRS resource. The offset indicates a slot-level interval between an SRS triggering time and an SRS sending time.

SUMMARY

According to a fifth aspect, the embodiments of this disclosure provide an SRS power control method, applied to a terminal. The method includes:
receiving configuration information from a network device, where the configuration information is used to configure N power control parameter sets, a power control parameter set includes a path loss estimation reference signal (path loss RS), the path loss RS is associated with a neighboring cell and/or a serving cell, and N is a positive integer; and
performing power control on at least one SRS unit according to the N power control parameter sets, where the at least one SRS unit is used for positioning, and an SRS unit is an SRS resource set or an SRS resource.

According to a second aspect, the embodiments of this disclosure further provide a configuration method for SRS power control, applied to a network device. The method includes:
sending configuration information to a terminal, where the configuration information is used to configure N power control parameter sets, the N power control parameter sets are used to perform power control on at least one SRS unit, the at least one SRS unit is used for positioning, an SRS unit is an SRS resource set or an SRS resource, a power control parameter set includes a path loss estimation reference signal (path loss RS), the path loss RS is associated with a neighboring cell and/or a serving cell, and N is a positive integer.

According to a third aspect, the embodiments of the present disclosure further provide a terminal, including:
a receiving module, configured to receive configuration information from a network device, where the configuration information is used to configure N power control parameter sets, a power control parameter set includes a path loss estimation reference signal (path loss RS), the path loss RS is associated with a neighboring cell and/or a serving cell, and N is a positive integer; and
a control module, configured to perform power control on at least one SRS unit according to the N power control parameter sets, where the at least one SRS unit is used for positioning, and an SRS unit is an SRS resource set or an SRS resource.

According to a fourth aspect, the embodiments of the present disclosure further provide a network device, including:
a sending module, configured to send configuration information to a terminal, where the configuration information is used to configure N power control parameter sets, the N power control parameter sets are used to perform power control on at least one SRS unit, the at least one SRS unit is used for positioning, an SRS unit is an SRS resource set or an SRS resource, a power control parameter set includes a path loss estimation reference signal (path loss RS), the path loss RS is associated with a neighboring cell and/or a serving cell, and N is a positive integer.

According to a fifth aspect, the embodiments of the present disclosure further provide a terminal, including a memory, a processor, and a program stored in the memory and executable on the processor. When the program is executed by the processor, steps of the foregoing SRS power control method are performed.

According to a sixth aspect, the embodiments of the present disclosure further provide a network device, including a memory, a processor, and a program stored in the memory and executable on the processor. When the program is executed by the processor, steps of the foregoing configuration method for SRS power control are performed.

According to a seventh aspect, the embodiments of the present disclosure further provide a non-transitory computer readable storage medium. The non-transitory computer readable storage medium stores a computer program. When the computer program is executed by a processor, steps of the foregoing SRS power control method are performed, or when the computer program is executed by a processor, steps of the foregoing configuration method for SRS power control are performed.

BRIEF DESCRIPTION OF DRAWINGS

FIG. 3 is a flowchart of a configuration method for SRS power control according to an embodiment of the present disclosure;

FIG. 4 is a structural diagram of a terminal according to an embodiment of the present disclosure;

FIG. 5 is a structural diagram of a network device according to an embodiment of the present disclosure;

DETAILED DESCRIPTION OF EMBODIMENTS

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of the present disclosure shall fall within the protection scope of the present disclosure.

The term "include" and any other variants in the specification and claims of this application mean to cover the non-exclusive inclusion, for example, a process, method, system, product, or device that includes a list of steps or units is not necessarily limited to those clearly listed steps or units, but may include other steps or units not clearly listed or inherent to such a process, method, product, or device. In addition, "and/or" used in the specification and claims means at least one of the connected objects. For example, A and/or B represents the following three cases: Only A exists, only B exists, and both A and B exist.

In the embodiments of the present disclosure, the term such as "exemplary" or "for example" is used to represent giving an example, an illustration, or a description. Any embodiment or design scheme described as "exemplary" or "for example" in the embodiments of the present disclosure should not be construed as being more preferred or advantageous than other embodiments or design schemes. To be precise, the use of the term such as "exemplary" or "for example" is intended to present a related concept in a specific manner.

At present, power control of an SRS resource in NR release 15 is based on a serving cell. Cells involved in positioning usually include a serving cell and a plurality of neighboring cells, but a signal of the serving cell is usually stronger than those of the plurality of neighboring cells. Therefore, if power control is performed on an SRS unit for positioning only according to the serving cell, uplink transmission power of an SRS resource sent to a neighboring cell is limited. As a result, the neighboring cell may be unable to normally receive an SRS resource for positioning.

The embodiments of the present disclosure are described below with reference to the accompanying drawings. An SRS power control method, a configuration method for SRS power control, and a related device provided in the embodiments of the present disclosure can be applied to a wireless communication system. The wireless communications system may be a 5G system, or an evolved long term evolution (eLTE) system, or a subsequent evolved communications system.

Figure 1:
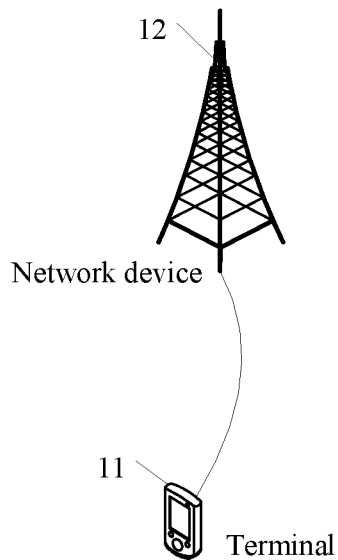
FIG. 1 is a structural diagram of a network system applicable to an embodiment of the present disclosure.

FIG. 1 is a structural diagram of a network system that can be applied to an embodiment of the present disclosure. As shown in FIG. 1, the network system includes: a terminal 11 and a network device 12. The terminal 11 may be a user terminal or other terminal devices, for example, a mobile phone, a tablet personal computer, a laptop computer, a personal digital assistant (PDA), a mobile Internet device (MID), or a wearable device. It should be noted that a type of the terminal 11 is not limited in the embodiments of the present disclosure. The network device 12 may be a base station in 5G or later releases, or a base station in other communications systems, or is referred to as a Node B, an evolved Node B, a transmission reception point (TRP), an access point (AP), or other words in the field, as long as the same technical effect is achieved. The network device is not limited to specific technical words. In addition, the network device 12 may be a master node (MN) or a secondary node (SN). It should be noted that in embodiments of the present disclosure, only the 5G base station is used as an example, but a type of the network device is not limited.

Figure 2:
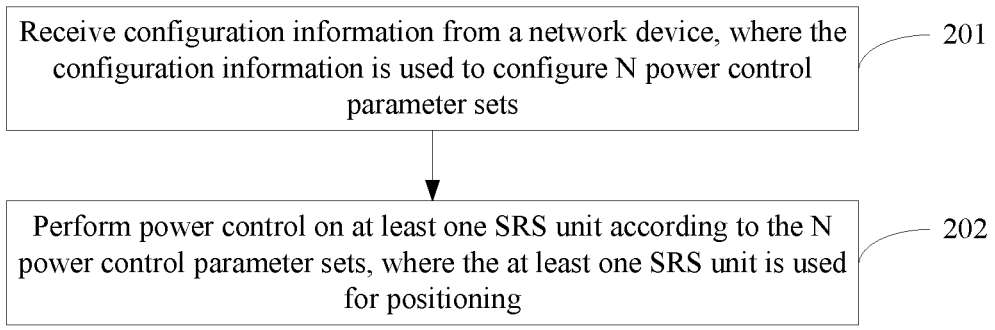
FIG. 2 is a flowchart of an SRS power control method according to an embodiment of the present disclosure.

FIG. 2 is a flowchart of a sounding reference signal SRS power control method according to embodiments of the present disclosure. The method is applied to a terminal. As shown in FIG. 2, the method includes the following steps.

Step 201: Receive configuration information from a network device, where the configuration information is used to configure N power control parameter sets, a power control parameter set includes a path loss estimation reference signal (path loss RS), the path loss RS is associated with a neighboring cell and/or a serving cell, and N is a positive integer.

Step 202: Perform power control on at least one SRS unit according to the N power control parameter sets, where the at least one SRS unit is used for positioning, and an SRS unit is an SRS resource set or an SRS resource.

In the embodiments of the present disclosure, in a case that the SRS unit is used for positioning, the network device may configure one or more independent power control parameter sets for the terminal. A cell associated with a path loss RS in a power control parameter set may be understood as that the power control parameter set is associated with the cell. The network device may send the configuration information through radio resource control (RRC) signaling, to configure the N power control parameter sets for the terminal.

After receiving the configuration information, the terminal may monitor a corresponding path loss RS according to a configuration of a power control parameter set corresponding to an SRS unit in the configuration information, to estimate a path loss measurement result, and finally determine, in combination with another parameter in the power control parameter set, the transmission power corresponding to the SRS unit, to control uplink transmission power of an SRS resource or an SRS resource set.

It should be understood that in the embodiments of the present disclosure, in addition to the path loss RS, the power control parameter set may further include at least one of P0, alpha, or a closed-loop power control adjustment state.

It should be noted that in a case that N is greater than 1, the power control parameter set may be associated with a serving cell in addition to a neighboring cell. That is, in an optional embodiment, in a case that N is greater than 1, the at least one path loss RS is associated with the serving cell.

In the embodiments of the present disclosure, the terminal performs power control on the SRS unit according to the N power control parameter sets configured by the network device, where the N power control sets are associated with a neighboring cell, or a neighboring cell and a serving cell. This can avoid limited uplink transmission power of the SRS resource, and the neighboring cell can more reliably receive the SRS resource sent by the terminal.

Optionally, there may be one or more path loss RSs. In the embodiments of the present disclosure, the path loss RS includes at least one of a positioning reference signal (PRS), a channel status information reference signal (CSI-RS), or a synchronization signal block (SSB).

Optionally, the configuration information may further indicate cell information associated with each path loss RS. In an optional embodiment, to reduce resources occupied by the configuration information, the configuration information is further used to indicate identifier information of a neighboring cell associated with the power control parameter set. In this case, in a case that the terminal is not indicated that a path loss RS is associated with a cell, the terminal may understand that the path loss RS is associated with a serving cell. Optionally, the network device may indicate a configured path loss RS through identifier information of the path loss RS. The identifier information of the path loss RS includes an identifier corresponding to the path loss RS and an associated cell identifier (cell ID), to indicate an association between each path loss RS and a cell.

Optionally, in an optional embodiment, the configuration information is further used to indicate transmission power of a synchronization signal block of a neighboring cell associated with the power control parameter set; or the configuration information is further used to indicate transmission power of the path loss RS.

In a case that a cell associated with a path loss estimation reference signal is a neighboring cell, the network device configures identifier information of the path loss estimation reference signal for the terminal. The identifier information of the reference signal is related to an identifier of the neighboring cell.

For example, in a case that the path loss estimation reference signal includes an SSB, identifier information of the SSB may include a cell ID and synchronization signal block index (SSB index) information. In a case that the path loss estimation reference signal includes a PRS, identifier information of the PRS may include at least one of a positioning reference signal resource identifier (PRS resource ID), a positioning reference signal resource set identifier (PRS resource set ID), a positioning reference signal identifier (PRSID), or a cell ID. In a case that the path loss estimation reference signal includes a CSI-RS, identifier information of the CSI-RS may include a cell ID and CSI-RS resource ID information.

Optionally, the network device needs to configure transmission power of an SSB of the neighboring cell for the terminal. The transmission power of the SSB may be absolute transmission power or relative transmission power relative to transmission power of an SSB of the serving cell. The transmission power of the SSB may be configured by a serving gNB according to RRC signaling or configured by a location server according to long-term-evolution positioning protocol (LPP) signaling. UE may indirectly calculate a path loss measurement result according to the transmission power of the SSB and received power of the path loss RS.

In an optional embodiment, in a case that the path loss estimation reference signal includes a PRS, the network device needs to configure a power offset between the PRS and an SSB of an associated cell (that is, configure 'powerControlOffsetSS' in a PRS resource field). The PRS power offset may be configured by the location server according to LPP signaling.

Alternatively, the network device configures the transmission power of the path loss RS of the neighboring cell for the terminal. The transmission power of the path loss RS may be configured by a serving gNB according to RRC signaling or configured by a location server according to LPP signaling. The UE may directly calculate a path loss measurement result according to the transmission power of the path loss RS and received power of the path loss RS.

Optionally, in a case that the cell associated with the path loss estimation reference signal is the serving cell, if the path loss estimation reference signal includes a PRS, the network device configures PRS identifier information for the terminal. The PRS identifier information may include at least one of a PRS resource ID, a PRS resource set ID, or a PRS ID. The identifier information of the PRS may be configured by the serving gNB according to RRC signaling. Optionally, the network side needs to configure a power offset between the PRS and an SSB (that is, configure 'powerControlOffsetSS' in a PRS resource field). The PRS power offset is configured by the location server according to LPP signaling.

It should be noted that power control manners corresponding to different SRS units are different. The following describes in detail two different implementation solutions in which the SRS unit is an SRS resource set and the SRS unit is an SRS resource.

Implementation solution 1: in a case that the SRS unit is an SRS resource set, the configuration information is used to configure N SRS resource sets, and the SRS resource set includes one power control parameter set.

In the implementation solution 1, the SRS resource set and the power control parameter set are in a one-to-one correspondence. Optionally, one or more SRS resources may be included in the SRS resource set. In this embodiment, power corresponding to the SRS resource set may be determined in a plurality of manners. For example, a power determining manner adopted by the terminal may be specified by the protocol, indicated by the network device, or selected by the terminal. After the N SRS resource sets are determined, the N SRS resource sets are sequentially sent according to sending moments of the N SRS resource sets configured by the network side.

Optionally, in determining manner 1, transmission power of the SRS resource set may be: transmission power calculated according to a power control parameter set corresponding to the SRS resource set. That is, transmission power of the SRS resource set may be calculated according to a power control parameter corresponding to each SRS resource set.

For example, if the determining manner 1 is indicated by the network device, the network device needs to send first indication information. The first indication information is used to instruct the terminal to use a corresponding power control parameter set to calculate the transmission power of the SRS resource set. The first indication information may be sent before or after the configuration information is sent, or may be carried in the configuration information. The implementation may be set according to actual needs, and there is no limitation herein.

Optionally, in determining manner 2, the SRS resource set includes a path loss RSs, and the a path loss RSs are associated with one cell. The transmission power of the SRS resource set is: transmission power calculated according to a first path loss measurement result.

The first path loss measurement result is an average or any one of c path loss measurement results. The c path loss measurement results are path loss measurement results corresponding to c path loss RSs in the SRS resource set. Both a and c are positive integers, and c is less than or equal to a.

The first path loss measurement result may be a maximum path loss measurement result, a minimum path loss measurement result, an average path loss measurement result, or any other path loss measurement result of the c path loss measurement results. Values of a and b may be set according to the actual situation, and the value of b may be indicated by the network device or specified by the protocol. In this embodiment, for an SRS resource set, a final first path loss measurement result may be determined according to path loss measurement results corresponding to path loss RSs, and the transmission power of the SRS resource set may be calculated based on the first path loss measurement result and another power control parameter in the power control parameter set.

For example, if the determining manner 2 is indicated by the network device, the network device needs to send second indication information. The second indication information is used to instruct the terminal to use the first path loss measurement result to calculate the transmission power of the SRS resource set. The second indication information may be sent before or after the configuration information is sent, or may be carried in the configuration information. The implementation may be set according to actual needs, and there is no limitation herein.

Optionally, in determining manner 3, in a case that N is greater than 1, transmission power of the N SRS resource sets is: transmission power calculated according to a second path loss measurement result;

where the second path loss measurement result is: an average or any one of path loss measurement results corresponding to M power control parameter sets, and M is a positive integer less than N.

In this manner, a same path loss measurement result may be used to calculate transmission power for each SRS resource set. The second path loss measurement result may be a maximum path loss measurement result, a minimum path loss measurement result, an average path loss measurement result, or any other path loss measurement result of the path loss measurement results corresponding to the M power control parameter sets.

For example, if the determining manner 3 is indicated by the network device, the network device needs to send third indication information. The third indication information is used to instruct the terminal to use the second path loss measurement result to calculate the transmission power of the SRS resource set. The third indication information may be sent before or after the configuration information is sent, or may be carried in the configuration information. The implementation may be set according to actual needs, and there is no limitation herein.

Optionally, in the determining manner 4, in a case that N is greater than 1, transmission power of the N resource sets is the same.

In this manner, the determined transmission power of each SRS resource set may be transmission power selected from transmission power corresponding to the power control parameter sets, or may be transmission power obtained by performing calculation on the transmission power corresponding to the power control parameter sets in a specific way, for example, may be an average obtained through average calculation.

For example, if the determining manner 4 is indicated by the network device, the network device needs to send fourth indication information. The fourth indication information is used to indicate that the transmission power of the N resource sets is the same. The fourth indication information may be sent before or after the configuration information is sent, or may be carried in the configuration information. The implementation may be set according to actual needs, and there is no limitation herein.

For example, the four indication information may indicate or it is specified in the protocol that the transmission power of the N resource sets is any one of:

a maximum value, a minimum value, or an average of transmission power corresponding to the M power control parameter sets; where M is a positive integer less than N;

transmission power of an SRS resource set corresponding to a serving cell;

transmission power corresponding to a power control parameter set of the M power control parameter sets that has a maximum path loss measurement value; or transmission power corresponding to a power control parameter set of the M power control parameter sets that has a minimum path loss measurement value.

It should be understood that after the transmission power is determined, one or more SRS resource sets may be sequentially sent.

Optionally, a cell associated with the path loss RS is the same as a receiving cell of a corresponding SRS resource set. The receiving cell is a cell that is used to receive the SRS resource set among cells participating in positioning, and may be a neighboring cell or a serving cell.

Optionally, a cell associated with the path loss RS is the same as a cell where a downlink reference signal spatially correlated to the SRS resource set is located, or the path loss RS is the same as a downlink reference signal spatially correlated to a corresponding SRS resource set. The downlink reference signal spatially correlated to the SRS resource set is: a downlink reference signal spatially correlated to an SRS resource in the SRS resource set.

Optionally, during SRS power control, a number of SRS resources in the SRS resource set is 1, which may be indicated by the network side or specified by the protocol. One power control parameter set in the SRS resource set is only used to configure one SRS resource. The N SRS resource sets are configured for the N power control parameter sets, which may also be understood as configuring N SRS resources.

Optionally, in a case that a number of SRS resources in the SRS resource set is greater than 1, a plurality of SRS resources in the SRS resource set have a same sending beam direction, or a plurality of SRS resources in the SRS resource set have a same spatially correlated reference signal.

Optionally, in a case that a number of SRS resources in the SRS resource set is greater than 1, transmission power of a plurality of SRS resources in the SRS resource set is the same.

For each SRS resource set, the network device indicates, to a corresponding receiving cell, configuration information related to at least one SRS resource set, so that the configuration information is used by the target cell to receive the SRS resource set. An indication process is: the serving cell indicates the configuration information of the SRS resource set to a location server (such as a Location Management Function (LMF)) through signaling (such as New Radio Positioning Protocol A (NRPPa)), and the location server indicates the configuration information of the SRS resource set to a specific receiving cell through signaling (such as NRPPa).

Implementation solution 2: in a case that the SRS unit is an SRS resource, the configuration information is used to configure at least one SRS resource in one SRS resource set, and the SRS resource set includes the N power control parameter sets.

Based on implementation solution 1 and implementation solution 2, step 202 may include:

determining transmission power of the at least one SRS unit according to path loss measurement results of path loss RSs of the N power control parameter sets.

In an optional embodiment, the determining transmission power of the at least one SRS unit according to path loss measurement results of path loss RSs of the N power control parameter sets includes:

determining, according to the path loss measurement results of the path loss RSs of the N power control parameter sets, transmission power corresponding to the N power control parameter sets; and determining the transmission power of the at least one SRS unit according to the transmission power corresponding to the N power control parameter sets.

Optionally, the determining, according to the path loss measurement results of the path loss RS s of the N power control parameter sets, transmission power corresponding to the N power control parameter sets includes:

determining, in a preset manner, transmission power corresponding to a third power control parameter set; where the third power control parameter set is any one of the N power control parameter sets, and the third power control parameter set satisfies any one of:

a path loss RS of the third power control parameter set is different from a monitored path loss RS;

received quality of a path loss RS of the third power control parameter set is less than a preset value; or transmission power of a path loss RS of the third power control parameter set could not be obtained.

In the embodiments of the present disclosure, that the transmission power of the path loss RS of the third power control parameter set could not be obtained means that the terminal has not received an indication of the transmission power of the path loss RS from the network side, and a path loss measurement result of the path loss RS cannot be estimated in this case. That the terminal has not received the indication of the transmission power of the path loss RS from the network side is, for example: the terminal fails to obtain the transmission power of the path loss RS directly or indirectly indicated by the network side. Directly indicating is: the network side directly indicates the transmission power of the path loss RS of the neighboring cell to the UE. Indirectly indicating is: the network side indicates the transmission power of the SSB and a power offset of the path loss RS relative to the transmission power of the SSB to the UE. A manner of determining the transmission power of the SRS unit may be indicated by the network device, specified by the protocol, or selected by the terminal. In a case that the network device performs indication, the network device may send fifth indication information to the terminal. The fifth indication information is used to instruct the terminal to determine the transmission power corresponding to the third power control parameter set in a preset manner.

Optionally, the preset manner includes any one of:

using an average or any one of transmission power corresponding to L fourth power control parameter sets as the transmission power corresponding to the third power control parameter set; where the L fourth power control parameter sets are power control parameter sets for obtaining path loss measurement results and determining transmission power by the terminal;

using transmission power corresponding to a power control parameter set corresponding to a serving cell as the transmission power corresponding to the third power control parameter set;

determining, according to a third path loss measurement result and a third power control parameter, the transmission power corresponding to the third power control parameter set; where the third path loss measurement result is an average or any one of L path loss measurement results, the L path loss measurement results are path loss measurement results corresponding to the L fourth power control parameter sets, and the third power control parameter is a power control parameter in the third power control parameter set other than a path loss RS; or determining, according to the third power control parameter and a path loss measurement result that corresponds to the serving cell, the transmission power corresponding to the third power control parameter set.

Optionally, in a case that the SRS unit is an SRS resource, L is a maximum number of allowable downlink path loss RSs monitored by the terminal; and in a case that the SRS unit is an SRS resource set, L is a maximum number of allowable power control parameter sets processed by the terminal.

That L is the maximum number of allowable power control parameter sets processed by the terminal may be understood as: a number of all path loss RSs included in the L power control parameter sets is a maximum number of allowable downlink path loss RSs monitored by the terminal. For example, in a case that the SRS unit is an SRS resource set and the number of SRS resources in the SRS resource set is 1, L is a maximum number of allowable downlink path loss RSs monitored by the terminal. A value of L may be determined according to the capability of the terminal. For example, the value of L may be selected by the terminal according to the capability of the terminal, or indicated by the network device according to capability information of the terminal.

Optionally, at least one path loss RS of path loss RSs in the L fourth power control parameter sets is associated with a serving cell.

Optionally, if the SRS unit is an SRS resource and the third power control parameter set exists, in addition to the alternative solution of determining the transmission power corresponding to the third power control parameter set, the third power control parameter set may not be used to calculate the transmission power of the SRS resource set. That is, in a case that the N power control parameter sets include a third power control parameter set, the third power control parameter set is not used for power control.

Optionally, the behavior of not using the third power control parameter set to calculate the transmission power of the SRS resource set may be indicated by the network device, specified by the protocol, or selected by the terminal. When the network device performs indication, the network device may send seventh indication information to the terminal. The seventh indication information is used to indicate that in a case that the N power control parameter sets include the third power control parameter set, the terminal does not use the third power control parameter set to perform power control.

Optionally, in a case that the SRS unit is an SRS resource, transmission power of the SRS resource is any one of:

transmission power calculated according to a power control parameter set where a path loss RS associated with target identifier information is located, where the target identifier information is cell identifier information spatially correlated to the SRS resource;

transmission power corresponding to a fifth power control parameter set indicated by the network device, where the fifth power control parameter set is a power control parameter set associated with a target cell in the N power control parameter sets;

a maximum value, a minimum value, or an average of transmission power corresponding to the N power control parameter sets;

transmission power corresponding to a sixth power control parameter set, where a path loss measurement result corresponding to the sixth power control parameter set is the largest or smallest; or transmission power calculated according to a fourth path loss measurement result in a case that the N power control parameter sets share the same P0 and the same alpha, where the fourth path loss measurement result is:
an average of path loss measurement results corresponding to the N power control parameter sets.

In the embodiments of the present disclosure, a manner of determining the SRS resource by the terminal may be specified by the protocol, or may be indicated by the network device, or may be selected by the terminal. For example, in a case that the network device performs indication, the network device may send sixth indication information to the terminal. The sixth indication information is used to instruct the terminal to determine the transmission power of the SRS resource in the foregoing manner. The sixth indication information may be sent before or after the configuration information is sent, or may be carried in the configuration information. The implementation may be set according to actual needs, and there is no limitation herein.

Optionally, in a case that transmission power of the SRS resource is transmission power corresponding to the fifth power control parameter set, the target cell is a receiving cell of the SRS resource.

After a plurality of SRS resources in one SRS resource set are determined, the plurality of SRS resources are sequentially sent according to sending moments of the plurality of SRS resources configured by the network side.

For each SRS resource, the network device indicates, to a corresponding receiving cell, configuration information related to at least one SRS resource, so that the configuration information is used by the target cell to receive the SRS resource. An indication process is: the serving cell indicates the configuration information of the SRS resource to a location server (such as an LMF) through signaling (such as NRPPa), and the location server indicates the configuration information of the SRS resource to a specific receiving cell through signaling (such as NRPPa).

Optionally, in a case that the power control parameter set includes a closed-loop power control adjustment state, the closed-loop power control adjustment state is not associated with a physical uplink shared channel (PUSCH). That is, independent power control is adopted.

Optionally, power control is performed over the at least one SRS unit in one of:

applying closed-loop power control to the at least one SRS unit;

skipping applying closed-loop power control to the at least one SRS unit; or applying closed-loop power control to a first SRS unit, and skipping applying closed-loop power control to a second SRS unit;

where the first SRS unit is an SRS unit over which power control is performed based on the first power control parameter set, a path loss RS of the first power control parameter set is associated with a serving cell, the second SRS unit is an SRS unit over which power control is performed based on the second power control parameter set, and a path loss RS of the second power control parameter set is associated with a neighboring cell.

In the embodiments of the present disclosure, it may be indicated by the network or specified by the protocol as follows: in a case that an SRS is used for positioning, closed-loop power control is not applied in a case that a first condition or a second condition is met. The first condition is that the closed-loop power adjustment state is set to 0, and the second condition is that the terminal receives TPC signaling. In other words, in a case that a manner of performing power control over the at least one SRS unit is skipping applying closed-loop power control to the at least one SRS unit, it indicates that in a case that the SRS unit is used for positioning, closed-loop power control is not applied to the at least one SRS unit in a case that the first condition or the second condition is met. In a case that a manner of performing power control over the at least one SRS unit is applying closed-loop power control to the first SRS unit and skipping applying closed-loop power control to the second SRS unit, it indicates that in a case that the SRS unit is used for positioning, closed-loop power control is not applied to the second SRS unit in a case that the first condition or the second condition is met.

For example, a power control formula of the SRS unit is as follows:

$$P_{SRS,b,f,c}(i, q_s, l) = \min \left\{ \begin{array}{l} P_{CMAX,f,c}(i) \\ P_{O\_SRS,b,f,c}(q_s) + 10\log_{10}(2^\mu M_{SRS,b,f,c}(i)) + \alpha_{SRS,b,f,c}(q_s) \cdot \\ PL_{b,f,c}(q_d) + h_{b,f,c}(i, l) \end{array} \right\};$$

where
- i represents a transmission time, and represents an SRS transmission occasion $^i$;
- $q_s$ represents target received power and path loss compensation factor value identifiers, and is also an SRS resource set identifier;
- $q_d$ represents a path loss estimation basis reference signal identifier, and is an RS index associated with the SRS resource set;
- l represents a closed-loop power control process identifier;
- $P_{CMAX, f,c}(i)$ represents maximum transmission power;
- $P_{O\_SRS,b,f,c}(q_s)$ and $\alpha_{SRS,b,f,c}(q_s)$ are target received power and a path loss compensation factor respectively;
- $M_{SRS,b,f,c}(i)$ represents a transmission bandwidth of an SRS;
- $PL_{b,f,c}(q_d)$ represents an estimated path loss value; and
- $h_{b,f,c}(i,l)$ a closed-loop power control adjustment.

The skipping applying closed-loop power control may be expressed as that the value of $h_{b,f,c}(i,l)$ is 0.

Optionally, the at least two power control parameter sets share at least one of the same P0 or the same alpha.

To better understand the present disclosure, a detailed description will be given below through an implementation process.

It is assumed that the cell associated with the path loss RS of a power control parameter set 1 is a serving cell, and the cell associated with the path loss RS of a control resource parameter set M is a neighboring cell M.

The network device notifies values of P0 and alpha corresponding to the resource parameter set M, a path loss RS identifier, and the closed-loop power control adjustment state to the UE through RRC signaling.

For example, in a case that the path loss RS is an SSB of a neighboring cell M, the identifier information of the SSB includes an SSB index and a cell ID. The UE may monitor the SSB and subtract the received power of the SSB from the transmission power of the SSB to estimate the SSB path loss.

In a case that the path loss RS is a CSI-RS of the neighboring cell M, the identifier information of the CSI-RS includes a CSI-RS resource ID and a cell ID. In addition, the network device indicates the transmission power of the SSB of the neighboring cell M to the UE through RRC signaling or LPP signaling. The transmission power of the SSB may be absolute power or relative power relative to the transmission power of the SSB of the serving cell. The UE may monitor the CSI-RS, and obtain the transmission power of the CSI-RS according to the transmission power of the SSB and 'powerControlOffsetSS' in the CSI-RS configuration information. Then, the UE subtracts the received power of the CSI-RS, to estimate path loss of the CSI-RS.

In a case that the path loss RS is a PRS of the neighboring cell M, the PRS identifier information includes at least one of a PRS resource ID, a PRS resource set ID, a PRS ID, or a cell ID. In addition, the network side indicates the transmission power of the SSB of the neighboring cell M through RRC signaling or LPP signaling. The transmission power of the SSB may be absolute power or relative power relative to the transmission power of the SSB of the serving cell. In addition, a parameter of the PRS resource configured by the network side need to include power offset information (powerControlOffsetSS) of the PRS relative to the SSB of the cell. The UE may estimate the transmission power of the PRS according to the transmission power of the SSB and power offset information of the PRS. Then, the UE subtracts the received power of the PRS, to estimate path loss of the PRS.

The network device may configure that the closed-loop power control adjustment state is not associated with a PUSCH, that is, in a case that the SRS resource or the SRS resource set is used for positioning, the network device may configure that srs-PowerControlAdjustmentStates is 'separateClosedLoop'. Similarly, in a case that the SRS resource or the SRS resource set is used for positioning, the UE expects that in a configuration of a power control set of the SRS resource set, srs-PowerControlAdjustmentStates is configured as 'separateClosedLoop', that is, SRS power control is independent power control and is not associated with a PUSCH.

In a case that the SRS resource or the SRS resource set is used for positioning, the closed-loop power control adjustment state h(i) is set to 0. Alternatively, in a case that the UE receives TPC command signaling, closed-loop power control is not applied to the closed-loop power control adjustment state of the SRS.

Based on the power control parameter set, a corresponding SRS power control formula is:

$$P_{SRS,b,f,c}(i, q_s, l) = \min \left\{ \begin{array}{l} P_{CMAX,f,c}(i) \\ P_{O\_SRS,b,f,c}(q_s) + 10\log_{10}(2^\mu M_{SRS,b,f,c}(i)) + \alpha_{SRS,b,f,c}(q_s) \cdot \\ PL_{b,f,c}(q_d) + h_{b,f,c}(i, l) \end{array} \right\};$$

where
- i represents a transmission time, and represents an SRS transmission occasion $^i$;
- $q_s$ represents target received power and path loss compensation factor value identifiers, and is also an SRS resource set identifier;
- $q_d$ represents a path loss estimation basis reference signal identifier, and is an RS index associated with the SRS resource set;
- l represents a closed-loop power control process identifier;
- $P_{CMAX,f,c}(i)$ represents maximum transmission power;
- $P_{O\_SRS,b,f,c}(q_s)$ and $\alpha_{SRS,b,f,c}(q_s)$ are target received power and a path loss compensation factor respectively;
- $M_{SRS,b,f,c}(i)$ represents a transmission bandwidth of an SRS;
- $PL_{b,f,c}(q_d)$ represents an estimated path loss value; and
- $h_{b,f,c}(i,l)$ a closed-loop power control adjustment.

The skipping applying closed-loop power control may be expressed as that the value of $h_{b,f,c}(i,l)$ is 0.

Optionally, in an embodiment, the network device configures that one or more SRS resource sets are sent sequentially. For each SRS resource set, the network device indicates, to a corresponding receiving cell, configuration information related to each SRS resource set, so that the configuration information is used by the target cell to receive the SRS resource set. The SRS resource set includes one power control parameter set.

In solution 1:

The UE may monitor the path loss RS, estimate the path loss measurement result during power calculation of each SRS resource set, and calculate the transmission power according to a sending moment of each SRS resource set and a power control parameter set configuration, and then send the one or more SRS resource sets sequentially.

For example, an SRS resource set includes an independent power control parameter set, and the power control parameter set includes a path loss RS set associated with cell A. At the same time, the network device indicates configuration information related to the SRS resource set to a receiving cell B (indicating the receiving cell of the SRS resource set) for the receiving cell B to receive the SRS resource set.

Optionally, cell A may be a cell where a downlink reference signal spatially correlated to the SRS resource is located.

Optionally, cell A may be the same as cell B.

Optionally, the path loss RS may be the same as the downlink reference signal spatially correlated to the SRS resource.

Optionally, the number of SRS resources in the SRS resource set may be one.

Optionally, if a number of SRS resources in the SRS resource set is greater than 1, a plurality of SRS resources in the SRS resource set have a same sending beam direction, or a plurality of SRS resources have a same spatially correlated RS.

Optionally, if a number of SRS resources in the SRS resource set is greater than 1, transmission power of a plurality of SRS resources in the SRS resource set is the same.

Optionally, the path loss RS may include one or more RSs from the same cell. There are multiple RSs. When estimating a path loss measurement result, the UE can select the largest/smallest path loss measurement result from multiple path loss measurement results (from multiple RSs) or obtain an average of multiple path loss measurement results to obtain a path loss measurement result finally used for calculation in one SRS resource set. This behavior may be indicated by the network, specified by the protocol, or selected by the UE.

In solution 2:

The UE monitors the path loss RS, and estimates the path loss measurement result during power calculation of each SRS resource set according to configuration information of a power control parameter set of an SRS resource set.

The UE uses the same path loss measurement result when calculating the transmission power of multiple SRS resource sets. That is, the UE can select the largest/smallest path loss measurement result in multiple path loss RS sets (multiple neighboring cells and one serving cell) or obtain an average of multiple path loss measurement results to obtain a final path loss measurement result. This behavior may be indicated by the network, specified by the protocol, or selected by the UE.

Then, according to another power control parameter (such as P0 and alpha), the UE obtains transmission power of each SRS resource set and sends the one or more SRS resource sets sequentially.

Optionally, the UE may also select another power control parameter corresponding to an SRS resource set corresponding to final path loss, to calculate transmission power of the SRS resource set. This transmission power is used as transmission power of all SRS resource sets. This behavior may be indicated by the network, specified by the protocol, or selected by the UE.

In solution 3:

The UE monitors the path loss RS, and estimates the path loss measurement result during power calculation of each SRS resource set according to configuration information of a power control parameter set of an SRS resource set, and then calculate transmission power corresponding to each SRS resource set.

The UE uses the same transmission power when transmitting multiple SRS resource sets.

The UE may select a maximum/minimum power value from multiple transmission power (multiple neighboring cells and one serving cell) or obtain an average of multiple power values to obtain final power. This behavior may be indicated by the network, specified by the protocol, or selected by the UE.

The UE may select a power value of the SRS resource set corresponding to the serving cell as the final power. This behavior may be indicated by the network, specified by the protocol, or selected by the UE.

The UE sends one or more SRS resource sets sequentially according to the final power.

Optionally, in an optional embodiment, during uplink positioning, the maximum number of downlink (DL) path loss RSs that the UE can monitor can be K, that is, the UE can obtain K path loss measurement results at most. K is selected by the UE (obtained based on the capability of the UE), indicated by the network, or specified in the protocol.

K may be equal to the number L of DL path loss RSs (respectively corresponding to multiple SRS resource sets) configured by the network device.

In a case that K is less than the number L of DL path loss RSs (respectively corresponding to multiple SRS resource sets) configured on the network side, the UE can choose to monitor 1 path loss RS associated with the serving cell and K-1 path loss RSs associated with neighboring cells, and obtain K path loss measurement results. The transmission power of the L SRS resource sets may be determined in one of: indicated by the network device, specified by the protocol, or selected by the UE.

In a solution, the transmission power of the L SRS resource sets is the same. For example, the solution 3 can be used to determine the transmission power of the L SRS resource sets.

In another solution, the same path loss measurement result is used for the L SRS resource sets, and the transmission power of the L SRS resource sets is determined according to other power control parameters (such as P0 and alpha) of the L SRS resource sets. For example, solution 2 can be used to determine the transmission power of the L SRS resource sets.

Optionally, the UE obtains the corresponding K path loss measurement results, and further obtains the transmission power of the SRS resource set corresponding to the K path loss RSs. Transmission power of other L-K SRS resource sets can be obtained in the following manner:

1. The transmission power of the L-K SRS resource sets is the same. Solution 3 is used.

2. The same path loss measurement result is used for the L-K SRS resource sets. Solution 2 is used. The transmission power of the L-K SRS resource sets is determined according to other power control parameters (such as P0 and alpha) of the L-K SRS resource sets.

3. Randomly allocate the K transmission power to the L-K SRS resource sets.

4. Randomly allocate the K path loss measurement results to the L-K SRS resource sets. The transmission power of the L-K SRS resource sets is determined according to other power control parameters (such as P0 and alpha) of the L-K SRS resource sets.

In another embodiment, the network device configures that one or more SRS resources in an SRS resource set are sent sequentially. For each SRS resource, the network device indicates, to a corresponding receiving cell, configuration information related to each SRS resource, so that the configuration information is used by the target cell to receive the SRS resource.

The UE monitors the path loss RS, estimates the path loss during power calculation of each SRS resource, and calculates the transmission power according to a sending moment of each SRS resource and a power parameter set configuration, and then send the one or more SRS resources sequentially.

For an SRS resource, the network device indicates, to a receiving cell, configuration information (indicating a receiving cell of the SRS resource) related to the SRS resource, so that the configuration information is used by the target cell to receive the SRS resource.

If the maximum number K of DL path loss RSs that the UE can monitor is less than the number L of DL path loss RSs (associated with the power control parameter set) indicated by the network side. For a certain SRS resource set, the UE can determine the transmission power value in one of:

(1) the UE selects the largest or smallest value from multiple K transmission power values as the transmission power of the SRS resource;

(2) the UE obtains an average of K transmission power values as the transmission power of the SRS resource;

(3) the UE selects the transmission power of the power control parameter set corresponding to the largest or smallest path loss measurement result;

(4) if the L power control parameter sets share the same P0 and alpha, the UE can obtain an average of the K path loss measurement results, and then calculate the transmission power of the SRS resource;

(5) the UE selects the transmission power calculated based on the path loss RS having the same cell ID as that of a reference signal spatially correlated to the SRS resource as the transmission power of the SRS resource; and (6) according to the instructions from the network side (RRC/Medium Access Control Control Element (MAC CE)/Downlink Control Information (DCI)), the UE selects transmission power corresponding to a certain power control parameter (associated with cell A) as the transmission power of the SRS resource; where cell A and cell B can be the same cell.

FIG. 3 is a flowchart of another configuration method for SRS power control according to an embodiment of the present disclosure. The method is applied to a network device. As shown in FIG. 3, the method includes the following step:

Step 301: Send configuration information to a terminal, where the configuration information is used to configure N power control parameter sets, the N power control parameter sets are used to perform power control on at least one SRS unit, the at least one SRS unit is used for positioning, the SRS unit is an SRS resource set or an SRS resource, the power control parameter set includes a path loss estimation reference signal (path loss RS), the path loss RS is associated with a neighboring cell and/or a serving cell, and N is a positive integer.

Optionally, the method further includes:
sending related configuration information of the SRS unit to a receiving cell corresponding to the SRS unit, where the related configuration information is used by the receiving cell to receive the SRS unit.

Optionally, the at least one path loss RS is associated with the serving cell.

Optionally, the path loss RS includes at least one of a PRS, a CSI-RS, or a SSB.

Optionally, in a case that the SRS unit is an SRS resource set, the configuration information is used to configure N SRS resource sets, and the SRS resource set includes one power control parameter set.

Optionally, the method further includes:
sending first indication information to the terminal, where the first indication information is used to instruct the terminal to use a corresponding power control parameter set to calculate the transmission power of the SRS resource set.

Optionally, the SRS resource set includes a path loss RSs, and the a path loss RSs are associated with one cell. The method further includes:
sending second indication information to the terminal, where the second indication information is used to instruct the terminal to use the first path loss measurement result to calculate the transmission power of the SRS resource set.

The first path loss measurement result is an average or any one of c path loss measurement results. The c path loss measurement results are path loss measurement results corresponding to c path loss RSs in the SRS resource set. Both a and c are positive integers, and c is less than or equal to a.

Optionally, in a case that N is greater than 1, the method further includes:
sending third indication information to the terminal, where the third indication information is used to instruct the terminal to use the second path loss measurement result to calculate the transmission power of the SRS resource set;
where the second path loss measurement result is: an average or any one of path loss measurement results corresponding to M power control parameter sets, and M is a positive integer less than N.

Optionally, in a case that N is greater than 1, the method further includes:
sending fourth indication information to the terminal, where the fourth indication information is used to indicate that the transmission power of the N resource sets is the same.

Optionally, a cell associated with the path loss RS is the same as a receiving cell of an SRS resource set.

Optionally, a cell associated with the path loss RS is the same as a cell where a downlink reference signal spatially correlated to the corresponding SRS resource set is located, or the path loss RS is the same as a downlink reference signal spatially correlated to a corresponding SRS resource set.

Optionally, in a case that a number of SRS resources in the SRS resource set is greater than 1, a plurality of SRS resources in the SRS resource set have a same sending beam direction, or a plurality of SRS resources in the SRS resource set have a same spatially correlated reference signal.

Optionally, in a case that a number of SRS resources in the SRS resource set is greater than 1, transmission power of a plurality of SRS resources in the SRS resource set is the same.

Optionally, in a case that the SRS unit is an SRS resource, the configuration information is used to configure at least one SRS resource in one SRS resource set, and the SRS resource set includes the N power control parameter sets.

Optionally, the method further includes:
sending fifth indication information to the terminal, where the fifth indication information is used to instruct the terminal to determine the transmission power corresponding to the third power control parameter set in a preset manner;
where the third power control parameter set is any one of the N power control parameter sets, and the third power control parameter set satisfies any one of:
a path loss RS of the third power control parameter set is different from a monitored path loss RS;
received quality of a path loss RS of the third power control parameter set is less than a preset value; or
transmission power of a path loss RS of the third power control parameter set could not be obtained.

Optionally, the preset manner includes any one of:
using an average or any one of transmission power corresponding to L fourth power control parameter sets as the transmission power corresponding to the third power control parameter set; where the L fourth power control parameter sets are power control parameter sets for obtaining path loss measurement results and determining transmission power by the terminal;
using transmission power corresponding to a power control parameter set corresponding to a serving cell as the transmission power corresponding to the third power control parameter set;
determining, according to a third path loss measurement result and a third power control parameter, the transmission power corresponding to the third power control parameter set; where the third path loss measurement result is an average or any one of L path loss measurement results, the L path loss measurement results are path loss measurement results corresponding to the L fourth power control parameter sets, and the third power control parameter is a power control parameter in the third power control parameter set other than a path loss RS; and determining, according to the third power control parameter and a path loss measurement result that corresponds to the serving cell, the transmission power corresponding to the third power control parameter set.

Optionally, in a case that the SRS unit is an SRS resource, L is a maximum number of allowable downlink path loss RSs monitored by the terminal; and in a case that the SRS unit is an SRS resource set, L is a maximum number of allowable power control parameter sets processed by the terminal.

Optionally, at least one path loss RS of path loss RSs in the L fourth power control parameter sets is associated with a serving cell.

Optionally, the method further includes:

sending sixth indication information to the terminal, where the sixth indication information is used to instruct the terminal to determine the transmission power of the SRS resource in any one of:

transmission power calculated according to a power control parameter set where a path loss RS associated with target identifier information is located, where the target identifier information is cell identifier information spatially correlated to the SRS resource;

transmission power corresponding to a fifth power control parameter set indicated by the network device, where the fifth power control parameter set is a power control parameter set associated with a target cell in the N power control parameter sets;

a maximum value, a minimum value, or an average of transmission power corresponding to the N power control parameter sets;

transmission power corresponding to a sixth power control parameter set, where a path loss measurement result corresponding to the sixth power control parameter set is the largest or smallest; or transmission power calculated according to a fourth path loss measurement result in a case that the N power control parameter sets share the same P0 and the same alpha, where the fourth path loss measurement result is: an average of path loss measurement results corresponding to the N power control parameter sets.

Optionally, in a case that transmission power of the SRS resource is transmission power corresponding to the fifth power control parameter set, the target cell is a receiving cell of the SRS resource.

Optionally, the method further includes:

sending seventh indication information to the terminal, where the seventh indication information is used to indicate that in a case that the N power control parameter sets include the third power control parameter set, the third power control parameter set is not used to perform power control, and the third power control parameter set satisfies any one of:

a path loss RS of the third power control parameter set is different from a monitored path loss RS;

received quality of a path loss RS of the third power control parameter set is less than a preset value; or transmission power of a path loss RS of the third power control parameter set could not be obtained.

Optionally, the configuration information is further used to indicate identifier information of a neighboring cell associated with the power control parameter set.

Optionally, in an optional embodiment, the configuration information is further used to indicate transmission power of a synchronization signal block of a neighboring cell associated with the power control parameter set; or the configuration information is further used to indicate transmission power of the path loss RS.

Optionally, in a case that the power control parameter set includes a closed-loop power control adjustment state, the closed-loop power control adjustment state is not associated with a physical uplink shared channel (PUSCH).

Optionally, the method further includes:

sending eighth indication information to the terminal, where the eighth indication information is used to indicate a manner of performing power control on at least one SRS unit, and the manner of performing power control includes one of:

applying closed-loop power control to the at least one SRS unit;

skipping applying closed-loop power control to the at least one SRS unit; or applying closed-loop power control to a first SRS unit, and skipping applying closed-loop power control to a second SRS unit;

where the first SRS unit is an SRS unit over which power control is performed based on the first power control parameter set, a path loss RS of the first power control parameter set is associated with a serving cell, the second SRS unit is an SRS unit over which power control is performed based on the second power control parameter set, and a path loss RS of the second power control parameter set is associated with a neighboring cell.

Optionally, the at least two power control parameter sets share at least one of the same P0 or the same alpha.

It should be noted that the embodiment is an implementation of the network device corresponding to the embodiment shown in FIG. 2. For the implementation, refer to the relevant description of the embodiment shown in FIG. 2. The same technical effects can be achieved. To avoid repetition, details are not described herein again.

FIG. 4 is a structural diagram of a terminal according to an embodiment of the present disclosure. As shown in FIG. 4, the terminal 400 includes:

a receiving module 401, configured to receive configuration information from a network device, where the configuration information is used to configure N power control parameter sets, the power control parameter set includes a path loss estimation reference signal path loss RS, the path loss RS is associated with a neighboring cell and/or a serving cell, and N is a positive integer; and a control module 402, configured to perform power control on at least one SRS unit according to the N power control parameter sets, where the at least one SRS unit is used for positioning, and the SRS unit is an SRS resource set or an SRS resource.

Optionally, the at least one path loss RS is associated with the serving cell.

Optionally, the path loss RS includes at least one of a PRS, a CSI-RS, or a SSB.

Optionally, in a case that the SRS unit is an SRS resource set, the configuration information is used to configure N SRS resource sets, and the SRS resource set includes one power control parameter set.

Optionally, transmission power of the SRS resource set is: transmission power calculated according to a power control parameter set corresponding to the SRS resource set.

Optionally, the SRS resource set includes a path loss RSs, and the a path loss RSs are associated with one cell. The transmission power of the SRS resource set is: transmission power calculated according to a first path loss measurement result.

The first path loss measurement result is an average or any one of c path loss measurement results. The c path loss measurement results are path loss measurement results corresponding to c path loss RSs in the SRS resource set. Both a and c are positive integers, and c is less than or equal to a.

Optionally, in a case that N is greater than 1, transmission power of the N SRS resource sets is: transmission power calculated according to a second path loss measurement result;
  where the second path loss measurement result is: an average or any one of path loss measurement results corresponding to M power control parameter sets, and M is a positive integer less than N.

Optionally, in a case that N is greater than 1, transmission power of the N resource sets is the same.

Optionally, a cell associated with the path loss RS is the same as a receiving cell of a corresponding SRS resource set.

Optionally, a cell associated with the path loss RS is the same as a cell where a downlink reference signal spatially correlated to the SRS resource set is located, or the path loss RS is the same as a downlink reference signal spatially correlated to a corresponding SRS resource set.

Optionally, in a case that a number of SRS resources in the SRS resource set is greater than 1, a plurality of SRS resources in the SRS resource set have a same sending beam direction, or a plurality of SRS resources in the SRS resource set have a same spatially correlated reference signal.

Optionally, in a case that a number of SRS resources in the SRS resource set is greater than 1, transmission power of a plurality of SRS resources in the SRS resource set is the same.

Optionally, in a case that the SRS unit is an SRS resource, the configuration information is used to configure at least one SRS resource in one SRS resource set, and the SRS resource set includes the N power control parameter sets.

Optionally, the control module is configured to: determine transmission power of the at least one SRS unit according to path loss measurement results of path loss RSs of the N power control parameter sets.
  Optionally, the control module includes:
  a calculation unit, configured to determine, according to the path loss measurement results of the path loss RSs of the N power control parameter sets, transmission power corresponding to the N power control parameter sets; and
  a determining unit, configured to determine the transmission power of the at least one SRS unit according to the transmission power corresponding to the N power control parameter sets.

Optionally, in a case that N is greater than 1, the determining, according to the path loss measurement results of the path loss RSs of the N power control parameter sets, transmission power corresponding to the N power control parameter sets includes:
  determining, in a preset manner, transmission power corresponding to a third power control parameter set;

where the third power control parameter set is any one of the N power control parameter sets, and the third power control parameter set satisfies any one of:
a path loss RS of the third power control parameter set is different from a monitored path loss RS;
received quality of a path loss RS of the third power control parameter set is less than a preset value; or
transmission power of a path loss RS of the third power control parameter set could not be obtained.

Optionally, the preset manner includes any one of:
using an average or any one of transmission power corresponding to L fourth power control parameter sets as the transmission power corresponding to the third power control parameter set; where the L fourth power control parameter sets are power control parameter sets for obtaining path loss measurement results and determining transmission power by the terminal;
using transmission power corresponding to a power control parameter set corresponding to a serving cell as the transmission power corresponding to the third power control parameter set;
determining, according to a third path loss measurement result and a third power control parameter, the transmission power corresponding to the third power control parameter set; where the third path loss measurement result is an average or any one of L path loss measurement results, the L path loss measurement results are path loss measurement results corresponding to the L fourth power control parameter sets, and the third power control parameter is a power control parameter in the third power control parameter set other than a path loss RS; or
determining, according to the third power control parameter and a path loss measurement result that corresponds to the serving cell, the transmission power corresponding to the third power control parameter set.

Optionally, in a case that the SRS unit is an SRS resource, L is a maximum number of allowable downlink path loss RSs monitored by the terminal; and
  in a case that the SRS unit is an SRS resource set, L is a maximum number of allowable power control parameter sets processed by the terminal.

Optionally, at least one path loss RS of path loss RSs in the L fourth power control parameter sets is associated with a serving cell.

Optionally, in a case that the SRS unit is an SRS resource, transmission power of the SRS resource is any one of:
transmission power calculated according to a power control parameter set where a path loss RS associated with target identifier information is located, where the target identifier information is cell identifier information spatially correlated to the SRS resource;
transmission power corresponding to a fifth power control parameter set indicated by the network device, where the fifth power control parameter set is a power control parameter set associated with a target cell in the N power control parameter sets;
the maximum value, minimum value, or average value of the transmission power corresponding to the N power control parameter sets;
transmission power corresponding to a sixth power control parameter set, where a path loss measurement result corresponding to the sixth power control parameter set is the largest or smallest; or
transmission power calculated according to a fourth path loss measurement result in a case that the N power control parameter sets share the same P0 and the same alpha, where the fourth path loss measurement result is:
an average of path loss measurement results corresponding to the N power control parameter sets.

Optionally, in a case that transmission power of the SRS resource is transmission power corresponding to the fifth power control parameter set, the target cell is a receiving cell of the SRS resource.

Optionally, in a case that the N power control parameter sets include a third power control parameter set, the third power control parameter set is not used for power control. The third power control parameter set satisfies any one of:
a path loss RS of the third power control parameter set is different from a monitored path loss RS;
received quality of a path loss RS of the third power control parameter set is less than a preset value; or
transmission power of a path loss RS of the third power control parameter set could not be obtained.

Optionally, the configuration information is further used to indicate identifier information of a neighboring cell associated with the power control parameter set.

Optionally, the configuration information is further used to indicate transmission power of a synchronization signal block of a neighboring cell associated with the power control parameter set; or the configuration information is further used to indicate transmission power of the path loss RS.

Optionally, in a case that the power control parameter set includes a closed-loop power control adjustment state, the closed-loop power control adjustment state is not associated with a PUSCH.

Optionally, power control is performed over the at least one SRS unit in one of:
applying closed-loop power control to the at least one SRS unit;
skipping applying closed-loop power control to the at least one SRS unit; or
applying closed-loop power control to a first SRS unit, and skipping applying closed-loop power control to a second SRS unit;
where the first SRS unit is an SRS unit over which power control is performed based on the first power control parameter set, a path loss RS of the first power control parameter set is associated with a serving cell, the second SRS unit is an SRS unit over which power control is performed based on the second power control parameter set, and a path loss RS of the second power control parameter set is associated with a neighboring cell.

Optionally, the at least two power control parameter sets share at least one of the same P0 or the same alpha.

The terminal provided in this embodiment of the present disclosure can implement the processes performed by the terminal in the method embodiment in FIG. 2. To avoid repetition, details are not described herein again.

Referring to FIG. 5, FIG. 5 is a structural diagram of a network device according to an embodiment of the present disclosure. As shown in FIG. 5, the network device 500 includes:
a sending module 501, configured to send configuration information to a terminal, where the configuration information is used to configure N power control parameter sets, the N power control parameter sets are used to perform power control on at least one SRS unit, the at least one SRS unit is used for positioning, the SRS unit is an SRS resource set or an SRS resource, the power control parameter set includes a path loss estimation reference signal (path loss RS), the path loss RS is associated with a neighboring cell and/or a serving cell, and N is a positive integer.

Optionally, related configuration information of the SRS unit is sent to a receiving cell corresponding to the SRS unit, where the related configuration information is used by the receiving cell to receive the SRS unit.

Optionally, the at least one path loss RS is associated with the serving cell. Optionally, the path loss RS includes at least one of a PRS, a CSI-RS, or a SSB.

Optionally, in a case that the SRS unit is an SRS resource set, the configuration information is used to configure N SRS resource sets, and the SRS resource set includes one power control parameter set.

Optionally, the sending module 501 is further configured to: send first indication information to the terminal, where the first indication information is used to instruct the terminal to use a corresponding power control parameter set to calculate the transmission power of the SRS resource set.

Optionally, the SRS resource set includes a path loss RSs, and the a path loss RSs are associated with one cell. The sending module 501 is further configured to: send second indication information to the terminal, where the second indication information is used to instruct the terminal to use the first path loss measurement result to calculate the transmission power of the SRS resource set.

The first path loss measurement result is an average or any one of c path loss measurement results. The c path loss measurement results are path loss measurement results corresponding to c path loss RSs in the SRS resource set. Both a and c are positive integers, and c is less than or equal to a.

Optionally, in a case that N is greater than 1, the sending module 501 is further configured to: send third indication information to the terminal, where the third indication information is used to instruct the terminal to use the second path loss measurement result to calculate the transmission power of the SRS resource set;
where the second path loss measurement result is: an average or any one of path loss measurement results corresponding to M power control parameter sets, and M is a positive integer less than N.

Optionally, in a case that N is greater than 1, the sending module 501 is further configured to send fourth indication information to the terminal, where the fourth indication information is used to indicate that the transmission power of the N resource sets is the same.

Optionally, a cell associated with the path loss RS is the same as a receiving cell of an SRS resource set.

Optionally, a cell associated with the path loss RS is the same as a cell where a downlink reference signal spatially correlated to the corresponding SRS resource set is located, or the path loss RS is the same as a downlink reference signal spatially correlated to a corresponding SRS resource set.

Optionally, in a case that a number of SRS resources in the SRS resource set is greater than 1, a plurality of SRS resources in the SRS resource set have a same sending beam direction, or a plurality of SRS resources in the SRS resource set have a same spatially correlated reference signal.

Optionally, in a case that a number of SRS resources in the SRS resource set is greater than 1, transmission power of a plurality of SRS resources in the SRS resource set is the same.

Optionally, in a case that the SRS unit is an SRS resource, the configuration information is used to configure at least one SRS resource in one SRS resource set, and the SRS resource set includes the N power control parameter sets.

Optionally, the sending module 501 is further configured to: send fifth indication information to the terminal, where the fifth indication information is used to instruct the terminal to determine the transmission power corresponding to the third power control parameter set in a preset manner;
- where the third power control parameter set is any one of the N power control parameter sets, and the third power control parameter set satisfies any one of:
- a path loss RS of the third power control parameter set is different from a monitored path loss RS;
- received quality of a path loss RS of the third power control parameter set is less than a preset value; or
- transmission power of a path loss RS of the third power control parameter set could not be obtained.

Optionally, the preset manner includes any one of:
- using an average or any one of transmission power corresponding to L fourth power control parameter sets as the transmission power corresponding to the third power control parameter set; where the L fourth power control parameter sets are power control parameter sets for obtaining path loss measurement results and determining transmission power by the terminal;
- using transmission power corresponding to a power control parameter set corresponding to a serving cell as the transmission power corresponding to the third power control parameter set;
- determining, according to a third path loss measurement result and a third power control parameter, the transmission power corresponding to the third power control parameter set; where the third path loss measurement result is an average or any one of L path loss measurement results, the L path loss measurement results are path loss measurement results corresponding to the L fourth power control parameter sets, and the third power control parameter is a power control parameter in the third power control parameter set other than a path loss RS; or
- determining, according to the third power control parameter and a path loss measurement result that corresponds to the serving cell, the transmission power corresponding to the third power control parameter set.

Optionally, in a case that the SRS unit is an SRS resource, L is a maximum number of allowable downlink path loss RSs monitored by the terminal; and
- in a case that the SRS unit is an SRS resource set, L is a maximum number of allowable power control parameter sets processed by the terminal.

Optionally, at least one path loss RS of path loss RSs in the L fourth power control parameter sets is associated with a serving cell.

Optionally, the sending module 501 is further configured to: send sixth indication information to the terminal, where the sixth indication information is used to instruct the terminal to determine the transmission power of the SRS resource in any one of:
- transmission power calculated according to a power control parameter set where a path loss RS associated with target identifier information is located, where the target identifier information is cell identifier information spatially correlated to the SRS resource;
- transmission power corresponding to a fifth power control parameter set indicated by the network device, where the fifth power control parameter set is a power control parameter set associated with a target cell in the N power control parameter sets;
- a maximum value, a minimum value, or an average of transmission power corresponding to the N power control parameter sets;
- transmission power corresponding to a sixth power control parameter set, where a path loss measurement result corresponding to the sixth power control parameter set is the largest or smallest; or
- transmission power calculated according to a fourth path loss measurement result in a case that the N power control parameter sets share the same P0 and the same alpha, where the fourth path loss measurement result is: an average of path loss measurement results corresponding to the N power control parameter sets.

Optionally, in a case that transmission power of the SRS resource is transmission power corresponding to the fifth power control parameter set, the target cell is a receiving cell of the SRS resource.

Optionally, the sending module 501 is further configured to: send seventh indication information to the terminal, where the seventh indication information is used to indicate that in a case that the N power control parameter sets include the third power control parameter set, the third power control parameter set is not used to perform power control, and the third power control parameter set satisfies any one of:
- a path loss RS of the third power control parameter set is different from a monitored path loss RS;
- received quality of a path loss RS of the third power control parameter set is less than a preset value; or
- transmission power of a path loss RS of the third power control parameter set could not be obtained.

Optionally, the configuration information is further used to indicate identifier information of a neighboring cell associated with the power control parameter set.

Optionally, in an optional embodiment, the configuration information is further used to indicate transmission power of a synchronization signal block of a neighboring cell associated with the power control parameter set; or the configuration information is further used to indicate transmission power of the path loss RS.

Optionally, in a case that the power control parameter set includes a closed-loop power control adjustment state, the closed-loop power control adjustment state is not associated with a PUSCH.

Optionally, the sending module 501 is further configured to: send eighth indication information to the terminal, where the eighth indication information is used to indicate a manner of performing power control on at least one SRS unit, and the manner of performing power control includes one of:
- applying closed-loop power control to the at least one SRS unit;
- skipping applying closed-loop power control to the at least one SRS unit; or
- applying closed-loop power control to a first SRS unit, and skipping applying closed-loop power control to a second SRS unit;
- where the first SRS unit is an SRS unit over which power control is performed based on the first power control parameter set, a path loss RS of the first power control parameter set is associated with a serving cell, the second SRS unit is an SRS unit over which power control is performed based on the second power control parameter set, and a path loss RS of the second power control parameter set is associated with a neighboring cell.

Optionally, the at least two power control parameter sets share at least one of the same P0 or the same alpha.

The network device provided in embodiments of the present disclosure can implement the processes implemented by the network device in the method embodiment of FIG. 3. To avoid repetition, details are not described herein again.

Figure 6:
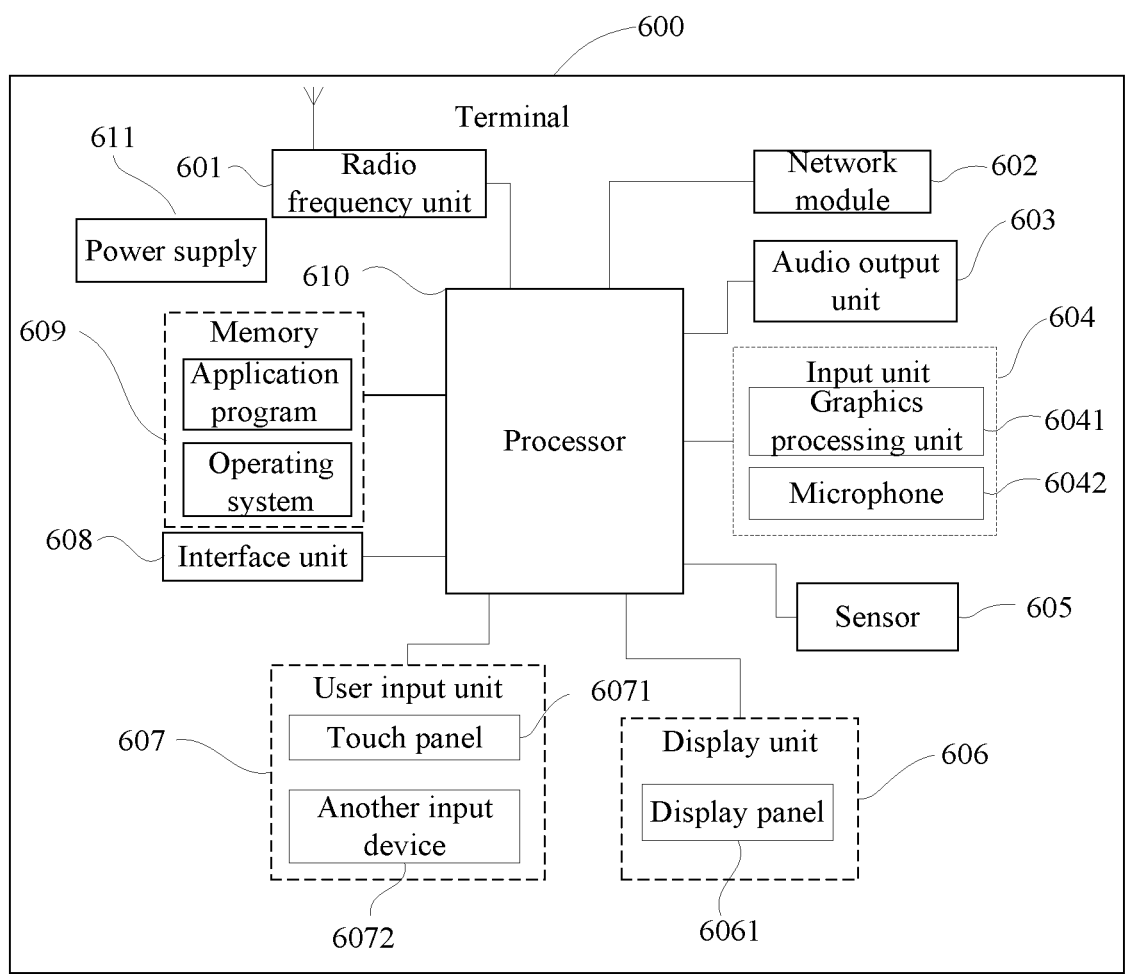
FIG. 6 is a structural diagram of another terminal according to an embodiment of the present disclosure.

FIG. 6 is a schematic structural diagram of hardware of a terminal implementing embodiments of the present disclosure. The terminal 600 includes but is not limited to: a radio frequency unit 601, a network module 602, an audio output unit 603, an input unit 604, a sensor 605, a display unit 606, a user input unit 607, an interface unit 608, a memory 609, a processor 610, a power supply 611, and other components. A person skilled in the art may understand that the structure of the terminal shown in FIG. 6 does not constitute a limitation to the terminal. The terminal may include more or fewer components than that shown in the figure, or a combination of some components, or an arrangement of different components. In this embodiment of the present disclosure, the terminal includes but is not limited to a mobile phone, a tablet computer, a notebook computer, a palmtop computer, a vehicle-mounted terminal, a wearable device, a pedometer, or the like.

The radio frequency unit 601 is configured to receive configuration information from a network device, where the configuration information is used to configure N power control parameter sets, the power control parameter set includes a path loss estimation reference signal (path loss RS), the path loss RS is associated with a neighboring cell and/or a serving cell, and N is a positive integer; and The processor 610 is configured to perform power control on at least one SRS unit according to the N power control parameter sets, where the at least one SRS unit is used for positioning, and the SRS unit is an SRS resource set or an SRS resource.

The terminal provided in the embodiments of the present disclosure may be configured to implement the terminal behavior in the method embodiment shown in FIG. 2. For example, for the implementation process of performing power control on at least one SRS unit, reference may be made to the description of the corresponding embodiment in FIG. 2, which is not limited herein.

In the embodiments of the present disclosure, the terminal performs power control on the SRS unit according to the N power control parameter sets configured by the network device, where the N power control sets are associated with a neighboring cell, or a neighboring cell and a serving cell. This can avoid limited uplink transmission power of the SRS resource, and the neighboring cell can more reliably receive the SRS resource sent by the terminal.

It should be understood that in the embodiments of the present disclosure, the radio frequency unit 601 can be configured to receive and send information or receive and send signal during calls. For example, the radio frequency unit receives downlink data from a base station, and transmits the downlink data to the processor 610 for processing. In addition, the radio frequency unit sends uplink data to the base station. Generally, the radio frequency unit 601 includes but is not limited to: an antenna, at least one amplifier, a transceiver, a coupler, a low noise amplifier, and a duplexer. In addition, the radio frequency unit 601 can also communicate with another device through a wireless communications system and network.

The terminal provides wireless broadband Internet access for the user by using the network module 602, for example, helping the user to send and receive an e-mail, browse a web page, and access streaming media.

The audio output unit 603 can convert audio data received by the radio frequency unit 601 or the network module 602 or stored in the memory 609 into an audio signal, and output the audio signal into sound. In addition, the audio output unit 603 can also provide audio output related to a specific function performed by the terminal 600 (for example, call signal receiving sound or message receiving sound). The audio output unit 603 includes a speaker, a buzzer, a telephone receiver, and the like.

The input unit 604 is configured to receive an audio signal or a video signal. The input unit 604 may include a graphics processing unit (GPU) 6041 and a microphone 6042. The graphics processing unit 6041 processes image data of a static picture or video obtained by an image capture apparatus (such as a camera) in a video capture mode or an image capture mode. A processed image frame can be displayed on the display unit 606. The image frame processed by the graphics processing unit 6041 may be stored in the memory 609 (or another storage medium) or sent by using the radio frequency unit 601 or the network module 602. The microphone 6042 may receive sound and can process the sound into audio data. The processed audio data can be converted into a format that can be sent to a mobile communications base station through the radio frequency unit 601 in a telephone call mode, for outputting.

The terminal 600 further includes at least one sensor 605, such as a light sensor, a motion sensor, and other sensors. For example, the light sensor includes an ambient light sensor and a proximity sensor. The ambient light sensor can adjust a brightness of a display panel 6061 based on a brightness of ambient light. The proximity sensor can close the display panel 6061 and/or backlight when the terminal 600 moves to an ear. As a motion sensor, an accelerometer sensor can detect magnitude of acceleration in various directions (usually three axes), can detect magnitude and the direction of gravity when stationary, can be configured to identify terminal postures (such as switching between a landscape mode and a portrait mode, related games, and magnetometer posture calibration), can perform functions related to vibration identification (such as a pedometer and a knock), and the like. The sensor 605 may further include a fingerprint sensor, a pressure sensor, an iris sensor, a molecular sensor, a gyroscope, a barometer, a hygrometer, a thermometer, an infrared sensor, or the like. Details are not described herein.

The display unit 606 is configured to display information entered by a user or information provided for the user. The display unit 606 may include a display panel 6061. The display panel 6061 may be configured in a form of a liquid crystal display (LCD), an organic light-emitting diode (OLED), or the like.

The user input unit 607 can be configured to receive input numeric or character information, and generate key signal inputs related to user settings and function control of the terminal. In particular, the user input unit 607 includes a touch panel 6071 and other input devices 6072. The touch panel 6071, also called a touch screen, can collect a touch operation of the user on or near the touch panel 6071 (For example, the user uses any suitable object or accessory such as a finger or a stylus to operate on or near the touch panel 6071). The touch panel 6071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, sends the contact coordinates to the processor 610, and receives and executes a command sent by the processor 610. In addition, the touch panel 6071 can be implemented in various types such as resistive, capacitive, infrared, and surface acoustic waves. In addition to the touch panel 6071, the user input unit 607 may further include another input device 6072. For example, the another input device 6072 may include but is not limited to a physical keyboard, function keys (such as a volume control key and a switch key), a trackball, a mouse, and a joystick. Details are not described herein.

Optionally, the touch panel 6071 may cover the display panel 6061. When detecting a touch operation on or near the touch panel 6071, the touch panel 6071 transmits the touch operation to the processor 610 to determine a type of a touch event. Then the processor 610 provides corresponding visual output on the display panel 6061 based on the type of the touch event. Although in FIG. 6, the touch panel 6071 and the display panel 6061 are configured as two independent components to implement input and output functions of the terminal, in some embodiments, the touch panel 6071 and the display panel 6061 can be integrated to implement the input and output functions of the terminal. Details are not limited herein.

The interface unit 608 is an interface for connecting an external apparatus to the terminal 600. For example, the external apparatus may include a wired or wireless headset port, an external power supply (or a battery charger) port, a wired or wireless data port, a memory card port, a port for connecting an apparatus having an identification module, an audio input/output (I/O) port, a video I/O port, a headset port, and the like. The interface unit 608 may be configured to receive an input (for example, data information or power) from an external apparatus and transmit the received input to one or more elements in the terminal 600, or transmit data between the terminal 600 and the external apparatus.

The memory 609 may be configured to store software programs and various data. The memory 609 may mainly include a program storage area and a data storage area. The program storage area may store an operating system, an application program required by at least one function (such as a sound playback function and an image playback function), and the like. The data storage area may store data (such as audio data and a phone book) created based on the use of the mobile phone, and the like. In addition, the memory 609 may include a high-speed random access memory, or may include a nonvolatile memory, for example, at least one disk storage device, a flash memory, or another volatile solid-state storage device.

The processor 610 is a control center of the terminal, connects various parts of the entire terminal by using various interfaces and circuits, and performs various functions of the terminal and processes data by running or executing software programs and/or modules stored in the memory 609 and invoking data stored in the memory 609, so as to monitor the terminal as a whole. The processor 610 may include one or more processing units. Optionally, the processor 610 may integrate an application processor with a modem processor. The application processor mainly processes the operating system, a user interface, the application program, and the like, and the modem processor mainly processes wireless communication. It may be understood that the foregoing modem processor may not be integrated into the processor 610.

The terminal 600 may further include the power supply 611 (for example, a battery) configured to supply power to various components. Optionally, the power supply 611 may be logically connected to the processor 610 through a power management system, so as to implement functions such as managing charging, discharging, and power consumption through the power management system.

In addition, the terminal 600 includes some function modules that are not shown. Details are not described herein.

Optionally, an embodiment of the present disclosure further provides a terminal, including a processor 610, a memory 609, and a computer program that is stored in the memory 609 and that can run on the processor 610. When the computer program is executed by the processor 610, each process of embodiments of the foregoing SRS power control method can be implemented, and a same technical effect can be achieved. To avoid repetition, details are not described herein again.

Figure 7:
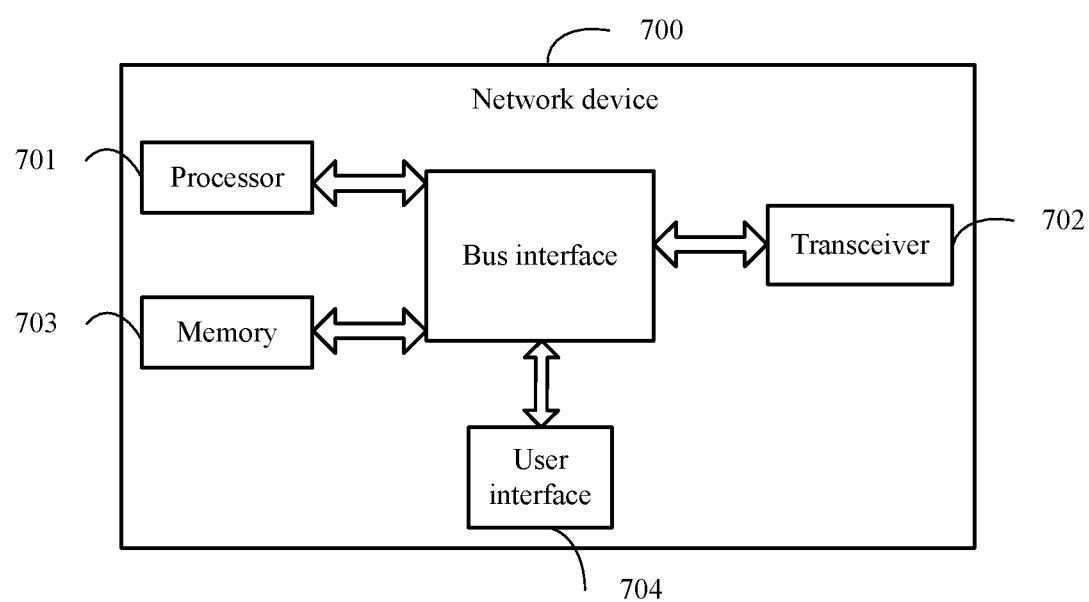
FIG. 7 is a structural diagram of another network device according to an embodiment of the present disclosure.

FIG. 7 is a structural diagram of another network device according to an embodiment of the present disclosure. As shown in FIG. 7, the network device 700 includes: a processor 701, a transceiver 702, a memory 703, a user interface, and a bus interface.

The transceiver 702 is configured to send configuration information to a terminal, where the configuration information is used to configure N power control parameter sets, the N power control parameter sets are used to perform power control on at least one SRS unit, the at least one SRS unit is used for positioning, the SRS unit is an SRS resource set or an SRS resource, the power control parameter set includes a path loss estimation reference signal (path loss RS), the path loss RS is associated with a neighboring cell and/or a serving cell, and N is a positive integer.

The terminal provided in the embodiments of the present disclosure may be configured to implement the behavior of the network device in the method embodiment shown in FIG. 3. For the implementation process, refer to description of the embodiment corresponding to FIG. 2. Details are not limited herein.

In the embodiments of the present disclosure, the terminal may perform power control on the SRS unit according to the N power control parameter sets configured by the network device, where the N power control sets are associated with a neighboring cell, or a neighboring cell and a serving cell. This can avoid limited uplink transmission power of the SRS resource, and the neighboring cell can more reliably receive the SRS resource sent by the terminal.

In FIG. 7, the bus architecture may include any number of interconnected buses and bridges, which are connected together by various circuits of one or more processors represented by the processor 701 and a memory represented by the memory 703. The bus architecture may further link various other circuits such as a peripheral device, a voltage regulator, and a power management circuit together. These are all well-known in the art, and therefore are not described in this specification. The bus interface provides an interface. The transceiver 702 may be a plurality of elements, that is, include a transmitter and a receiver, and provide units for communication with various other apparatuses on a transmission medium. For different user equipments, the user interface 704 may alternatively be an interface for externally and internally connecting a required device. The connected device includes, but not limited to, a keypad, a display, a loudspeaker, a microphone, a joystick, and the like.

The processor 701 is responsible for bus architecture management and general processing. The memory 703 may store data used by the processor 701 when the processor 81 performs an operation.

Optionally, an embodiment of the present disclosure further provides a network device, including a processor 701, a memory 703, and a computer program stored in the memory 703 and executable on the processor 701. When the computer program is executed by the processor 701, each process of the embodiments of the foregoing configuration method for SRS power control can be implemented, and a same technical effect can be achieved. To avoid repetition, details are not described herein again.

An embodiment of the present disclosure further provides a non-transitory computer readable storage medium, where the non-transitory computer readable storage medium stores a computer program, the computer program, when executed by the processor, implements the processes of the embodiments of the configuration method for SRS power control for a network device side provided in the embodiment of the present disclosure, or the computer program, when executed by the processor, implements the processes of the embodiments of the SRS power control method for a terminal provided in the embodiment of the present disclosure, and the same technical effects can be achieved. To avoid repetition, details are not described herein again. The non-transitory computer-readable storage medium may be a read-only memory (ROM), a random access memory (RAM), a magnetic disk, a compact disc, or the like.

It should be noted that, in this specification, the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. In absence of more constraints, an element preceded by "includes a . . . " does not preclude the existence of other identical elements in the process, method, article, or apparatus that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation manner. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be a mobile phone, a computer, a server, an air conditioner, a base station, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely exemplary instead of restrictive. Under enlightenment of the present disclosure, a person of ordinary skills in the art may make many forms without departing from the aims of the present disclosure and the protection scope of claims, all of which fall within the protection of the present disclosure.

What is claimed is:

1. A sounding reference signal (SRS) power control method, applied to a terminal, comprising:
receiving configuration information from a network device, wherein the configuration information is used to configure N power control parameter sets, wherein the configuration information is further used to indicate transmission power of a synchronization signal block of a neighboring cell associated with a power control parameter set or transmission power of a path loss estimation reference signal (path loss RS);
the power control parameter set comprises the path loss RS, the path loss RS is associated with a neighboring cell and/or a serving cell, and N is a positive integer; and
performing power control on at least one SRS unit according to the N power control parameter sets, wherein the at least one SRS unit is used for positioning, and an SRS unit is an SRS resource set or an SRS resource.

2. The method according to claim 1, wherein the path loss RS comprises at least one of a positioning reference signal (PRS), a channel state information reference signal (CSI-RS), or a synchronization signal block (SSB), and identifier information of the path loss RS is configured by the network device for the terminal.

3. The method according to claim 2, wherein the path loss RS is the SSB or the PRS; wherein
when the path loss RS is the SSB, identifier information of the SSB comprises a synchronization signal block index; or
when the path loss RS is the PRS, identifier information of the PRS comprises a positioning reference signal resource identifier.

4. The method according to claim 1, wherein in a case that the SRS unit is the SRS resource set, the configuration information is used to configure N SRS resource sets, and the SRS resource set comprises one power control parameter set.

5. The method according to claim 4, wherein in a case that N is greater than 1, transmission power of the N SRS resource sets is transmission power calculated according to a second path loss measurement result;
wherein the second path loss measurement result is an average or any one of path loss measurement results corresponding to M power control parameter sets, and M is a positive integer less than N.

6. The method according to claim 4, wherein a cell associated with the path loss RS is same as a receiving cell of a corresponding SRS resource set; or
a cell associated with the path loss RS is same as a cell where a downlink reference signal spatially correlated to the SRS resource set is located, or the path loss RS is same as a downlink reference signal spatially correlated to a corresponding SRS resource set.

7. The method according to claim 4, wherein in a case that a number of SRS resources in the SRS resource set is greater than 1, a plurality of SRS resources in the SRS resource set have a same sending beam direction, or a plurality of SRS resources in the SRS resource set have a same spatially correlated reference signal; or
in a case that a number of SRS resources in the SRS resource set is greater than 1, transmission power of a plurality of SRS resources in the SRS resource set is same.

8. The method according to claim 4, wherein the performing power control on at least one SRS unit according to the N power control parameter sets comprises:

determining transmission power of the at least one SRS unit according to path loss measurement results of path loss RSs of the N power control parameter sets.

9. The method according to claim 8, wherein the determining transmission power of the at least one SRS unit according to path loss measurement results of path loss RSs of the N power control parameter sets comprises:
determining, according to the path loss measurement results of the path loss RSs of the N power control parameter sets, transmission power corresponding to the N power control parameter sets; and
determining the transmission power of the at least one SRS unit according to the transmission power corresponding to the N power control parameter sets.

10. The method according to claim 9, wherein in a case that N is greater than 1, the determining, according to the path loss measurement results of the path loss RSs of the N power control parameter sets, transmission power corresponding to the N power control parameter sets comprises:
determining, in a preset manner, transmission power corresponding to a third power control parameter set;
wherein the third power control parameter set is any one of the N power control parameter sets, and the third power control parameter set satisfies any one of:
a path loss RS of the third power control parameter set is different from a monitored path loss RS;
received quality of a path loss RS of the third power control parameter set is less than a preset value; or
transmission power of a path loss RS of the third power control parameter set could not be obtained.

11. The method according to claim 10, wherein the preset manner comprises any one of:
using an average or any one of transmission power corresponding to L fourth power control parameter sets as the transmission power corresponding to the third power control parameter set; wherein the L fourth power control parameter sets are power control parameter sets for obtaining path loss measurement results and determining transmission power by the terminal;
using transmission power corresponding to a power control parameter set corresponding to a serving cell as the transmission power corresponding to the third power control parameter set;
determining, according to a third path loss measurement result and a third power control parameter, the transmission power corresponding to the third power control parameter set; wherein the third path loss measurement result is an average or any one of L path loss measurement results, the L path loss measurement results are path loss measurement results corresponding to the L fourth power control parameter sets, and the third power control parameter is a power control parameter in the third power control parameter set other than the path loss RS; or
determining, according to the third power control parameter and a path loss measurement result that corresponds to the serving cell, the transmission power corresponding to the third power control parameter set.

12. The method according to claim 9, wherein in a case that the SRS unit is the SRS resource, transmission power of the SRS resource is any one of:
transmission power calculated according to a power control parameter set where a path loss RS associated with target identifier information is located, wherein the target identifier information is cell identifier information spatially correlated to the SRS resource;
transmission power corresponding to a fifth power control parameter set indicated by the network device, wherein the fifth power control parameter set is a power control parameter set associated with a target cell in the N power control parameter sets;
a maximum value, a minimum value, or an average of transmission power corresponding to the N power control parameter sets;
transmission power corresponding to a sixth power control parameter set, wherein a path loss measurement result corresponding to the sixth power control parameter set is the largest or smallest; or
transmission power calculated according to a fourth path loss measurement result in a case that the N power control parameter sets share same P0 and same alpha, wherein the fourth path loss measurement result is an average of path loss measurement results corresponding to the N power control parameter sets.

13. The method according to claim 1, wherein in a case that the SRS unit is the SRS resource, the configuration information is used to configure at least one SRS resource in one SRS resource set, and the SRS resource set comprises the N power control parameter sets.

14. The method according to claim 1, wherein power control is performed on the at least one SRS unit in one of:
applying closed-loop power control to the at least one SRS unit;
skipping applying closed-loop power control to the at least one SRS unit; or
applying closed-loop power control to a first SRS unit, and skipping applying closed-loop power control to a second SRS unit;
wherein the first SRS unit is an SRS unit over which power control is performed based on a first power control parameter set, a path loss RS of the first power control parameter set is associated with a serving cell, the second SRS unit is an SRS unit over which power control is performed based on a second power control parameter set, and a path loss RS of the second power control parameter set is associated with a neighboring cell.

15. The method according to claim 1, wherein in a case that the power control parameter set comprises a closed-loop power control adjustment state, the closed-loop power control adjustment state is not associated with a physical uplink shared channel.

16. A configuration method for sounding reference signal (SRS) power control, applied to a network device, comprising:
sending configuration information to a terminal, wherein the configuration information is used to configure N power control parameter sets, wherein
the configuration information is further used to indicate transmission power of a synchronization signal block of a neighboring cell associated with a power control parameter set or transmission power of a path loss estimation reference signal (path loss RS); and
the N power control parameter sets are used to perform power control on at least one SRS unit, the at least one SRS unit is used for positioning, an SRS unit is an SRS resource set or an SRS resource, the power control parameter set comprises the path loss RS, the path loss RS is associated with a neighboring cell and/or a serving cell, and N is a positive integer.

17. The method according to claim 16, further comprising:
  sending related configuration information of the SRS unit to a receiving cell corresponding to the SRS unit, wherein the related configuration information is used by the receiving cell to receive the SRS unit.

18. A terminal, comprising a memory, a processor, and a program stored in the memory and executable on the processor, wherein the program, when executed by the processor, causes the processor to perform:
  receiving configuration information from a network device, wherein the configuration information is used to configure N power control parameter sets, wherein the configuration information is further used to indicate transmission power of a synchronization signal block of a neighboring cell associated with a power control parameter set or transmission power of a path loss estimation reference signal (path loss RS);
  the power control parameter set comprises the path loss RS, the path loss RS is associated with a neighboring cell and/or a serving cell, and N is a positive integer; and
  performing power control on at least one SRS unit according to the N power control parameter sets, wherein the at least one SRS unit is used for positioning, and an SRS unit is an SRS resource set or an SRS resource.

19. The terminal according to claim 18, wherein the path loss RS comprises at least one of a positioning reference signal (PRS), a channel state information reference signal (CSI-RS), or a synchronization signal block (SSB), and identifier information of the path loss RS is configured by the network device for the terminal.

20. The terminal according to claim 19, wherein the path loss RS is the SSB or the PRS; wherein
  when the path loss RS is the SSB, identifier information of the SSB comprises a synchronization signal block index; or
  when the path loss RS is the PRS, identifier information of the PRS comprises a positioning reference signal resource identifier.

* * * * *